ent [19] [11] 3,757,515
Pais [45] Sept. 11, 1973

[54] AUTOCOMBINE ENGINE

[76] Inventor: George S. Pais, 52 Harris St., Peabody, Mass. 01960

[22] Filed: July 6, 1972

[21] Appl. No.: 269,448

[52] U.S. Cl. .................. 60/13 F, 60/39.69, 417/393
[51] Int. Cl. ............................................ F02b 37/04
[58] Field of Search .............. 60/13 F, 39.69, 39.14; 417/393

[56] References Cited
UNITED STATES PATENTS

| | | | |
|---|---|---|---|
| 3,051,148 | 8/1962 | Warner | 60/39.14 |
| 3,088,276 | 5/1963 | Hudson | 60/39.69 |
| 3,127,881 | 4/1964 | Kosoff | 60/13 F |
| 2,413,957 | 1/1947 | Daub | 60/13 F |

FOREIGN PATENTS OR APPLICATIONS

| | | | |
|---|---|---|---|
| 188,403 | 12/1936 | Switzerland | 60/13 F |

Primary Examiner—Carlton R. Croyle
Assistant Examiner—Warren Olsen
Attorney—Thomas C. Stover, Jr.

[57] ABSTRACT

A piston drive combustion engine is provided wherein the pistons are reciprocated by the force of combustion in combination with a helical spring. A compressed air-fuel mixture is ignited in the combustion chamber which explodes and drives a piston rearward while simultaneously expelling a blast of gases at the vanes of a turbine wheel spinning the same. The rearward stroke of the piston drives a compressed air-fuel mixture into the next succeeding combustion chamber to recommence the combustion cycle therein and provide an automatic sequence fluid piston drive turbine engine.

10 Claims, 6 Drawing Figures

3,757,515

AUTOCOMBINE ENGINE

FIELD OF THE INVENTION

This invention relates to a piston drive turbine engine, particularly an automatic self-timing turbine engine.

THE PRIOR ART

Internal combustion engines, including piston drive turbine and crankshaft engines, have enjoyed long and widespread use in the industrialized countries, particularly the latter, in static machines or as vehicle engines. Heretofore the piston-drive turbine engine has not shown significant advantage over the simpler and more compact piston-drive crankshaft engine, herein, crankshaft engine, and the latter engine has predominated particularly as a vehicle engine.

As is well known, both types of engines employ pistons in fuel compression, which are reciprocated mechanically by cam or a crank mechanism. The piston drive turbine engine while incorporating the potential advantages of powerful torque and smooth rotational motion of the flywheel has yet to achieve its full potential of speed and power, dur to the fact that previously, the above pistons, are mechanically reciprocated by cam, crankshaft and the like. See for example U.S. Pat. No. 820,238, Al Moss and U.S. Pat. No. 1,052,308, W.G. Thammel. The speed of mechanical reciprocation and RPM of such engines are necessarily limited by the breakdown threshold of the piston reciprocating system and its components. For cam drive and crankshaft drive pistons, the breakdown point appears to be about 8,000 RPM. Additionally, the mechanical reciprocation of pistons has problems of power loss, friction and maintenance.

Non piston-drive turbine engines are of a different category and will not be discussed herein except to say that these engines have been characterized by relatively low fuel compression, prolonged warm-up time and require a high idling speed with resultant added fuel consumption.

Additionally, previous piston-drive turbine and crankshaft engines have had considerable power loss and inefficiency, up to 70 percent or more power loss due to the escape from the combustion chamber of the products of incomplete combustion and of unburned fuel, with the resultant emission of pollutants to the atmosphere.

Accordingly, a piston drive turbine engine which substantially overcomes the above shortcomings has heretofore not been available.

There has now been discovered a piston-drive turbine engine which has departed from mechanical reciprocation of pistons and utilizes the forces of combustion in piston reciprocation, in fuel input to successive combustion chambers and in automatic timing of combustion in successive combustion chambers which discharge a succession of blasts to the vaned periphery of a turbine wheel. Freed from the limitations of mechanical piston reciprocation, unheard-of piston reciprocation frequencies and engine RPM and power can be developed. Additionally provided is a system wherein the pistons automatically close and open their respective combustion chambers prior to and during the combustion cycle for maximum drive, RPM and power.

SUMMARY

Broadly, the present invention provides for a piston-drive turbine engine having a plurality of combustion chambers mounted around the periphery of the vaned wheel of said turbine, said chambers communicating at the combustion and thereof with the turbine wheel, each chamber having a piston axially slidably mounted therein, to reciprocate between the fluid flow end and the combustion end of said chamber, which combustion end has an exhaust port in proximity with periphery of the vaned wheel, the method of automatic timing, sequence driving of said turbine comprising; advancing the piston in one of said chambers to the combustion end thereof, to form a closed combustion chamber, feeding air into said chamber behind said advancing piston, feeding a compressed air-fuel mixture into said chamber at the combustion end thereof, igniting said mixture to drive the piston backward and open the closed combustion chamber and expel the combustion gases against said vaned wheel to drive the same and concurrently to drive the piston further backward to compress and expel the air from the chamber and simultaneously, to mix the so-compressed air with fuel and input the resultant compressed air-fuel mixture into the next succeeding combustion chamber to recommence the combustion-exhaust cycle thereat.

Also provided is an automatic cycle, self-timing, fluid piston drive turbine engine, more fully described hereinafter.

DESCRIPTION

This invention will become more apparent from the following detailed specification and drawings in which:

FIG. 2b is an elevation view of a component of the section of FIG. 2a;

Figure 1:
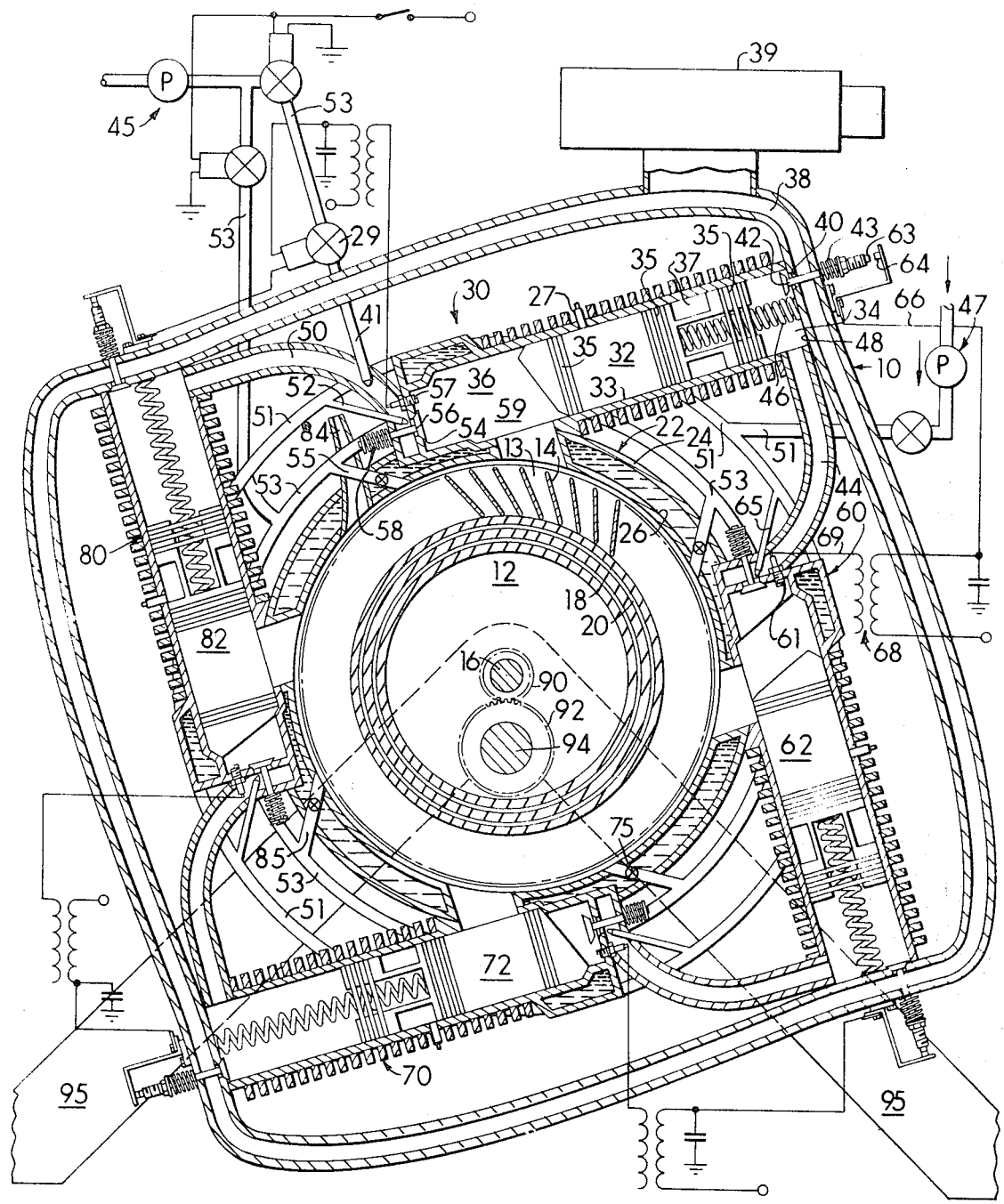
FIG. 1 is a sectional elevation view of the turbine engine embodying the invention.
Figure 2:
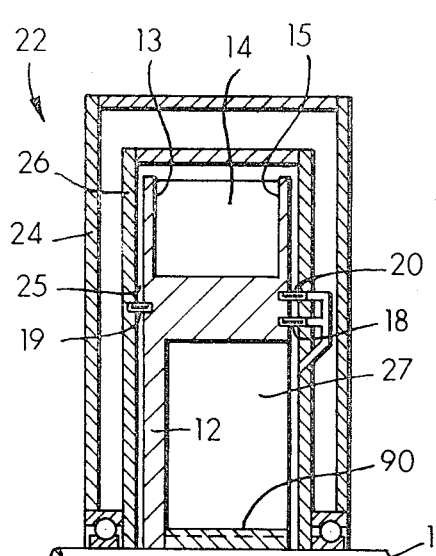
FIG. 2 is a cross-sectional elevation view of the turbine wheel of FIG. 1.

Referring now to the drawings, turbine engine 10 has turbine fly wheel 12, with bucket vanes 14 bracketed between bucket walls 13 and 15 on the periphery thereof, which turbine wheel 12 is rotatably mounted on axis 16 as shown in FIGS. 1 and 2. The turbine wheel 12 is housed within water cooled chamber 22 having walls 24 and 26 as shown in FIGS. 1 and 2. Communicating with the vaned periphery of said turbine wheel 12 are four combustion chambers 30, 60, 70 and 80 as shown in FIG. 1. Situated in chamber 30 is piston 32 which can be solid but preferably is hollow within, in axially sliding engagement with the walls of said chamber for reciprocating between the fluid flow end 34 and the combustion end 36, as shown in FIG. 1. The piston 32 slides on seal friction rings 35 within the chamber 30 and the rings 35 seal the lubrication oil in piston annulus 37, as shown in FIG. 1. Air is introduced into the fluid flow end 34 of the chamber 30 via air inlet 39, air duct 38 and port 40, which is opened and closed by stem valve 42 and air is discharged from the chamber 30 by way of duct 44 which feeds compressed air input to the next chamber 60 as shown in FIG. 1. Spring 43 holds stem valve 42 closed, as shown in FIG. 1. Piston spring 46, attached to chamber wall 48 and to the piston 32, urges the piston 32 against the combustion end 36 of the chamber 30 as shown in FIG. 1. Compressed air duct 50 and pressurized fuel duct 52 feed a compressed air-fuel mixture into the closed combustion chamber 30 via port 54, which is opened and closed by stem valve 56. Stem valve 56 is held closed by spring 58 as shown in FIG. 1.

Air compressor 45 supplies compressed air via lines 53 to the turbine engine 10 where needed and fuel pump 47, via lines 51 provides pressurized fuel to the combustion chambers 30, 60, 70 and 80 as described herein.

Also situated in said chamber is sprak plug 57 and combustible exhaust port 59 which prior to explosion is completely covered and closed off by a portion 33 of the cylinder 32 as shown in chamber 30 of FIG. 1.

Above stem valve 42 are electrical contacts 63 and 64 which are connected via conductor 66 to battery (not shown) and then to coil 68 which, in turn, is connected via conductor 69 to spark plug 61 in combustion chamber 60 as shown in FIG. 1.

Figure 2A:
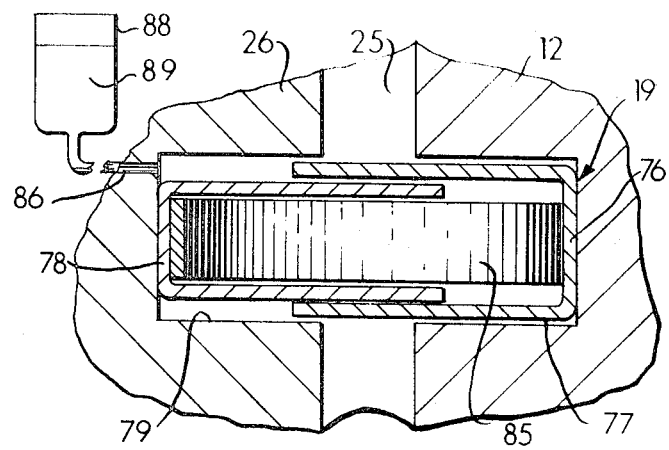
FIG. 2a is an enlarged fragmentary section of the turbine wheel of FIG. 2.
Figure 2B:
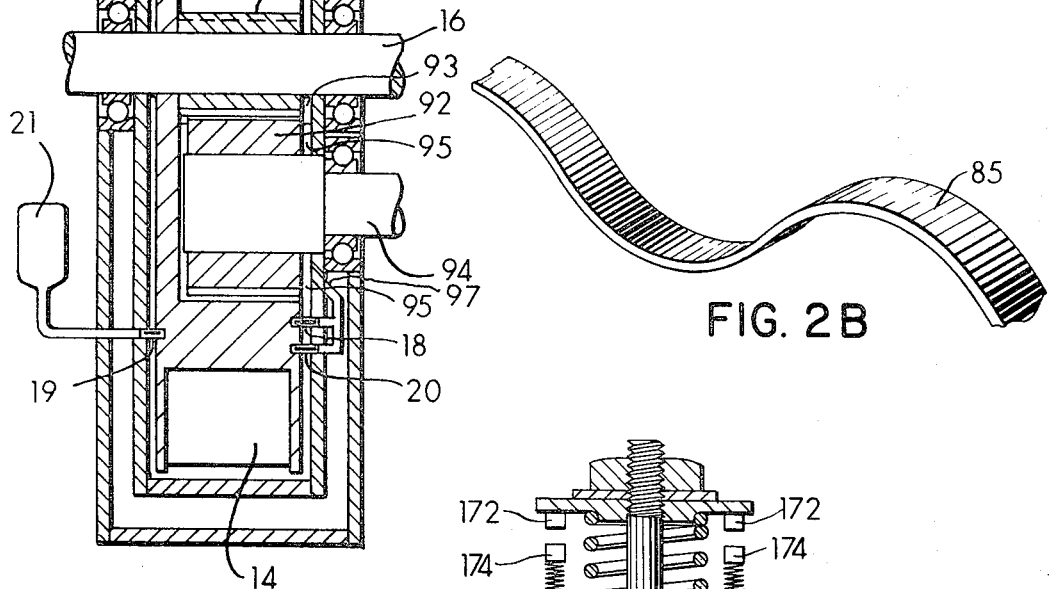

The turbine wheel 12, housed within water cooled chamber 22, having walls 24 and 26, rotates on axle 16 and drives gears 90, 92 and drive shaft 94 as shown in FIGS. 1 and 2. These gear shafts and wheels are lubricated by lubricant 95 which is contained in the space 93 between gear 92, turbine wheel 12 and chamber wall 26, as shown in FIG. 2. Ring seals 18, 19 and 20 seal off the turbine wheel 12 with the chamber wall 26 as shown in FIGS. 1 and 2. The ring seals 18, 19 and 20 serve to block the combustion gases from filling the spaces 25 and 27 between the turbine wheel 12 and chamber wall 25, which could cause rotational drag and maintenance problems. The ring seals e.g. seal 19 includes ring half 78 which fits within ring half 76 and serpentine spring 85 which fits therebetween as shown in FIGS. 2a and 2b. Ring half 76 fits within groove 77 of rotatable turbine wheel 12 and ring half 78 fits within groove 79 of static chamber wall 26, the entire seal ring 19 rotating with turbine wheel 12 with spring 85 pressing rotating ring half 78 against static groove 79 as shown in FIG. 2a. Lubrication between ring half 78 and groove 79 is provided by lubricant cup 88 and lubricant duct 86, which feeds lubricant 89 thereto alos as shown in FIG. 2a. Seal rings 18 and 20 have similar construction, but are lubricated by lube duct 97 which feeds lubricant 95 thereto.

In operation with piston 32 closed against exhaust port 59, compressed air is admitted from compressed air line 53 via valve 49 into air duct 50 and flows into contact with stem valve 56, forcing the said valve to open into the combustion end 36, whereupon pressurized fuel line 52 and air duct 50 pour a compressed air-fuel mixture through port 54 into the closed combustion chamber end 36 and when the air-fuel mixture fills the chamber end 36 to a desired pressure, spring 58 forces the stem valve 56 to close against the port 54 as shown in FIG. 1. Thereupon pressure sensing device 29 senses when said chamber has reached a desired pressure, e.g. 45 psi and fires spark plug 57 and explosively ignites said mixture, forcing said piston 32 upward and expelling a blast of gases out of the chamber 30 and against the vanes 14 of the turbine wheel 12, drving said wheel clockwise. The explosion further drives said piston 32 against its spring 46 toward the fluid flow end 34 of the chamber 30 which compresses before it the air therein and expels the so-compressed air through duct 44 into the next combustion chamber 60 to form an air-fuel mixture in the manner described above.

The piston 32, after reaching the top of its stroke, is urged back to the combustion end 36 of said chamber by spring 46, drawing behind it, by suction, stem valve 42 and air at atmospheric pressure through port 40. The forward stroke of said piston 32 flushes most of the combustion gases out of the chamber 30 before sealing off said chamber.

As the stem valve 42 is drawn open, electrical contacts 63 and 64 are broken, which fires spark plug 61 in the next combustion chamber 60.

As shown, the upstroke of the piston of one chamber fuels the next chamber and the return stroke of said piston fires the fuel mixture in said next chamber. Thus the above descibed cycle is repeated for successive chambers and successive blasts of gas combustibles are directed at the vaned turbine wheel. Thus the engine of the invention is self-timing, self-synchronizing as each chamber automatically primes the next and each fires in turn, giving a succession of blasts to the rapidly spinning turbine fly wheel 12.

Each chamber is virtually flushed by the return stroke of its piston, which then closes off its respective chamber for the next fueling and firing step. In addition, compressed air duct 53 feeds compressed air through inlet valve 55 into the passing vanes 14 to assist the complete combustion of any unburned combustibles therein, emitted from previous chambers to greatly reduce the pollution products from said turbine. Successive air valves 65, 75 and 85 complete the combustion of the fuel. The turbine engine vents its exhaust porducts via vent 84 as shown in FIG. 1.

The sequence of the firing cycles of the turbine engine 10 can be readily seen in FIG. 1, wherein chamber 30, having fired, piston 32 is on the return or suction stroke, which causes contacts 63 and 64 to break, firing spark plug 61 in chamber 60. In chamber 60, spark plug 61 has just fired and is driving its piston 62 rearward, which compresses air therein and drives the so-compressed air plus fuel into the next chamber 70. In chamber 80, piston 82 has just been returned to the closed position, ready for delivery of the compressed air-fuel mixture that will result when piston 72 is explosively driven rearward in chamber 70. Thus the automatic self-feeding, self-timing of each successive combustion chamber of the turbine engine of the invention is evident.

Power is transmitted from the turbine wheel 12 by various gear arrangements. For example, gear 90, axially mounted on the said wheel is engaged with reduction gear 92 for driving the same as shown in FIG. 1. The entire engine assembly is positioned on support frame 95.

Figure 3:
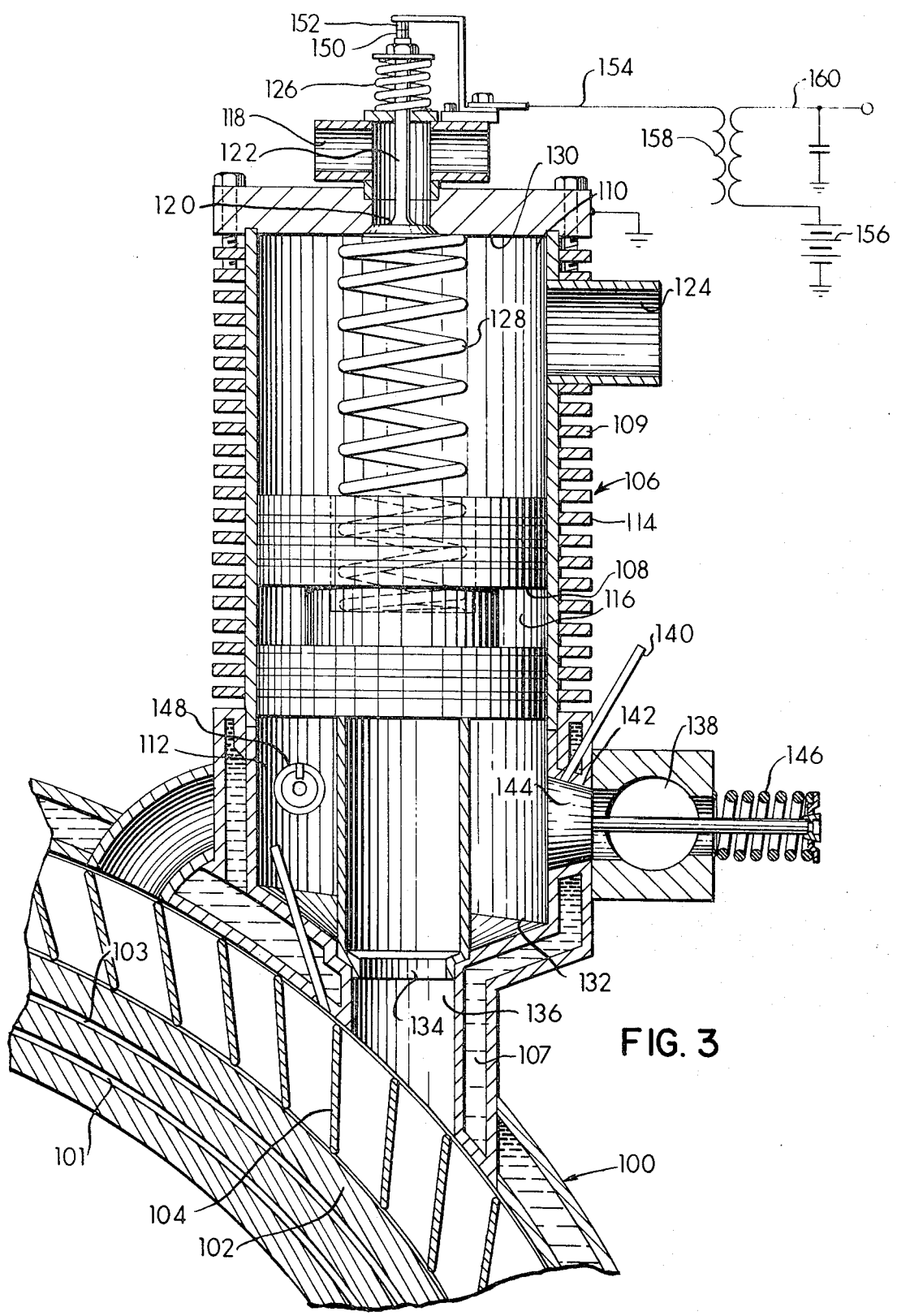
FIG. 3 is an enlarged sectional elevation view of another combustion chamber embodying the present invention.

In another embodiment, turbine fly wheel 102 of turbine engine 100, having seal rings 101 and 102, is powered by a plurality of upright combustion chambers such as upright chamber 106, shown in FIG. 3. Combustion chamber 106, which has water cooled jacket 107 and cooling fins 109, houses piston 108 which reciprocates between the fluid flow end 110 and the combustion end 112. The piston 108 slides within said chamber on seal friction rings 114 and the rings 114 seal the lubrication oil in the piston annulus 116 as shown in FIG. 3. Air is introduced into the fluid flow end 110 of the chamber 106 via air duct 118 and port 120 which is opened and closed by stem valve 122 and air is discharged from the chamber 106 by way of duct 124 which feeds air input (compressed) to the next combustion chamber of the turbine engine 100. Spring 126 holds stem valve 122 closed as shown in FIG. 3. Piston spring 128 attached to chamber wall 130 and to the piston 108, urges the piston 108 against the combustion end 132 of the chamber 106 so that the beveled extension 134[1] ([1]which extension can be solid or hollow and closed or hollow and open at the end thereof, to contain additional air for combustion of said fuel.) closes off the chamber blast port 136, closing the chamber 106 as shown in FIG. 3. Compressed air duct 138 and pressurized fuel duct 140 feed a compressed air-fuel mixture into the closed combustion chamber 106 via port 142 which is opened and closed by stem valve 144. Stem valve 144 is held closed by spring 146 and opened by an impulse of compressed air received from the previous combustion chamber via compressed air duct 138. Also situated in the chamber 106 is a spark plug 148 which fires also on signal from said previous combustion chamber and blast port 136 which then opened directs combustible gas products at the vanes 104 of the turbine wheel 102 as shown in FIG. 3.

Above stem valve 122 are electrical contacts 150 and 152 which are electrically connected via conductor 154 to battery 156 and coil 158, which in turn is connected via conductor 160 to the spark plug in the next combustion chamber (not shown) as shown in FIG. 3. The operation of the above upright combustion chamber and turbine fly wheel is similar to the turbine engine of FIG. 1.

Figure 4:
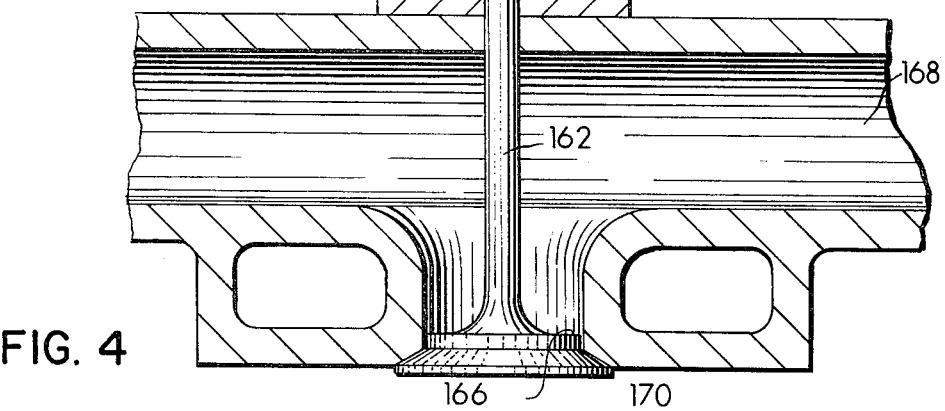
FIG. 4 is a fragmentary sectional elevation view of the upper portion of another combustion chamber embodying the invention.

In another embodiment of spark plug circuitry, air intake valve 162, restrained by valve spring 164 closes air inlet port from air duct 168 to combustion chamber 170 as shown in FIG. 4. On the suction stroke of the piston (not shown) of chamber 170, the valve 162 is pulled downward closing electrical cntacts 172 and 174 which charges its spark coil (not shown). When the piston seats in the closed position, the stem valve 162 rises under pressure of spring 164, which opens contacts 172 and 174, firing the spark plug in the next combustion chamber as before described. These are double contacts suitable for high voltage systems e.g. where transformer arcs replace spark plugs for low grade fuel. These type of contacts fire on every other stroke of the piston and thus are suitable for a two-chamber turbine engine or more.

Thus contacts 172 and 174 in chamber 1 won't fire the spark plug in chamber 2 until the piston in chamber 1 is in the closed position and ready to receive pressurized fuel input. Then the spark plug fires in chamber 2 which in turn drives pressurized fuel into chamber 1 as previously described.

As shown on the above description, the turbine engine of the present invention is automatic, self-timing with chambers that progressively fire at the periphery of the vaned turbine which fire in rapid succession. One chamber fuels and fires the next and therefore the timing and sequence of combustion is automatic.

In the engine of the present invention, each portion reciprocates automatically without being burdened by the limitations of cam or crank drive. The pistons move on the rearward stroke by the force of combustion and return to firing position on the forward (suction) stroke by the expanding force of a compressed spring. Accordingly, the speed or frequency of reciprocation of the piston is limited by the physical characteristics of the piston spring, the speed of the explosive upward stroke of the piston and unheard-of high speed piston reciprocation and high turbine RPM is obtained.

As shown above, the engine of the present invention is highly efficient in that each chamber develops explosive drive for every two strokes (one cycle) of its piston as compared with the conventional crankshaft piston vehicle engine wherein combustion takes place only for every four strokes (two cycles) of each piston therein. Accordingly, the increased speed and power characteristics of the engine of the present invention is readily apparent.

The turbine engine of the present invention is additionally efficient in that as previously discussed, the rearward or explosive strokes of each piston rapidly pumps compressed air and fuel into the next combustion chamber so that both strokes of a piston are utilized fully. The subsequent forward (suction) stroke of that piston then causes the spark plug in the next just-fueled chamber to fire as previously described.

Further efficiency is demonstrated in the engine of the present invention in that the rearward stroke of a piston is not mechanically performd as in the prior art, with the limitations discussed above, but the rearward piston stroke is accomplished by the explosive pressure of combustion with resultant high speed piston and turbine RPM of up to 20,000 RPM and more becoming available.

Additionally, in place of cam driven valves which have opened and closed the combustion chambers of the prior art prior to and after explosion, the chambers of the engine of the present invention are closed by the forward stroke of the piston and opened by the rearward stroke thereof by the forces of combustion. Less moving parts are required and less power loss results.

Moreover, the engine of the present invention provides for compressed air injection between combustion chambers at the vaned periphery of the turbine wheel which as previously described, results in the combustion of unburned combustibles, and thus resulting in more complete combustion of the fuel, and reduction of pollutants in the exhaust emmissions thereof.

Two types of combustion chambers are shown in the drawings, upright and tangential. It is evident that various other positionings of combustion chambers can be accomplished within the scope of the present invention. The piston and chambers can take various shapes desired provided the pistons reciprocate in close proximity with the walls of the chamber thereof.

The springs which power the pistons on their suction stroke are preferably of steel, but can be of various materials. The piston springs have a resilient force which equals or exceeds the input fuel-mixture pressure, e.g. from 40 to 60 psi. Similarly, the springs on the respective stem valves are of the same material as above, and in the same psi range.

Compressed air is fed to the combustion chamber of the invention at any pressure desired, preferably between 40 psi and 60 psi, and particularly preferred is 45 psi. Fuel is fed to said chamber at any pressure desired, preferably between 5 psi and 20 psi and particularly preferred is 10 psi. The extent the air is compressed depends on the ratio of the volumes of succeeding chambers. Air drawn from the atmosphere into the fluid flow end of a chamber on the suction stroke of the piston thereof is compressed into the smaller space of the combustion end of the next chamber. One advantageous ratio is 3:1, where atmospheric pressure is compressed to nearly 45 psi.

As previously stated, successive blasts from the combustion chambers drive the turbine fly wheel, the blasts being directed against the vanes of said wheel. As shown in FIG. 1, the vanes are preferably enclosed on two sides to gather and contain the full force of the blasts gases of combustion and to minimize gas build up, drag and fluid friction between the spinning turbine wheel and its stationary housing walls. If desired, however, said vanes need not be enclosed.

The turbine wheel is preferably made of metal, e.g. steel and the vanes are preferably of stainless steel. The wheel is preferably a fly wheel e.g. weighted around the periphery thereof, but any other weight distributions on said wheel are included within the present invention.

As also indicated in FIG. 1, power can be transmitted from the turbine wheel of the invention various ways, e.g. by a shaft connected to the axis of said wheel, by a gear engaged with the periphery of said wheel, by various gear combinatins in contact with the axis or other portions of said wheel, including step-up, reduction gears or a combinations thereof.

The high voltage arc assembly of FIG. 4 is suitable for engines of two chambers or more and employs a voltage of 15,000 to 25,000 volts. The lower voltage spark generator system of FIG. 1 employs voltages of 15,000 to 25,000 volts and preferably 20,000 volts.

The pistons and other portions of said engine are lubricated by various lubricants e.g. light oil or grease and the like. Other lubricants can be employed within the scope of the present invention.

As indicated in FIGS. 1 and 3, various portions of the turbine engine are cooled either by water or air or, if desired, other fluid.

The turbine engine of the invention can be used in all applications which frequently employ conventional piston, crankshaft or turbine engines, including motor vehicles, aircraft, generators and the like.

The autocombine engine embodying the present invention burns all available hydrocarbon fuels, including gasoline, petroleum, including diesel oil, natural gas and the like. Various other combustible fuels can be employed.

What is claimed is:

1. In a turbine engine having a plurality of combustion chambers mounted around the periphery of the vaned wheel of said turbine, said chambers communicating at the combustion end thereof with the turbine wheel, the said chambers having reciprocal pistons therein, each chamber having a piston axially slideably mounted therein, the piston reciprocating between the fluid flow end and the combustion end of said chamber, which latter end has an exhaust port in proximity with the said vaned wheel, the method of automatic timing sequence driving of said turbine engine comprising; feeding a compressed air-fuel mixture into one of the said chambers at the combustion end thereof, advancing the piston in said chamber to the combustion end thereof to form a closed combustion chamber, feeding air into said chamber behind said advancing piston, igniting said mixture to drive said piston backward and open said closed combustion chamber and expel the combustion gases against said vaned wheel to drive the same and concurrently to drive said piston further backward to compress and expel the so-compressed air from said chamber and simultaneously, to mix said compressed air with fuel and input the resultant compressed air-fuel mixture into the next succeeding combustion chamber to recommence the combustion-exhaust cycle thereat.

2. An automatic cycle self-timing turbine engine comprising:

a rotatably mounted turbine wheel having vanes mounted around the periphery thereof;

a plurality of combustion chambers positioned around said turbine wheel, each chamber opening at its combustion end via an exhaust port to a portion of the vaned periphery of said turbine wheel, each chamber having a fluid intake port and a fluid discharge port at the fluid flow end of said chamber remote from said combustion end;

each combustion chamber having therein a piston mounted in close sliding engagement with the walls of said chamber so as to axially slide back and forth within said chamber between said fluid flow end and said combustion end;

spring means axially mounted within said chamber between said fluid flow end and said piston to urge said piston against said combustion end to close said exhaust port and form a closed combustion chamber between said piston and said combustion end;

a fluid input port situated in said so-defined closed combustion chamber;

a fluid input port situated in said fluid input port;

duct means connecting the fluid discharge port of one of said chambers with the fluid input port of the next successive combustion chamber in the direction of rotation of said turbine wheel, each of said chambers being so connected to the next succeeding chamber;

means for opening said fluid input port into said chamber for feeding a fuel-compressed air mixture therein when said piston has moved against said combustion end and formed said closed combustion chamber;

means for admitting air into the fluid flow end of said chamber through said fluid intake port behind said piston as it moves to the combustion end of said chamber;

means for igniting said mixture driving said piston away from said opening, said exhaust port, expelling the combustion gases from said chamber and against said vanes spinning said turbine wheel, said piston being driven toward said fluid flow end of said chamber, compressing the admitted air and expelling said fluid discharge port through said duct means to the fluid input port of the next successive chamber, automatically recommencing said combustion exhaust-cycle thereat and commencing successive combustion-exhaust cycles in successive of said combustion chambers to drive said turbine wheel.

3. The turbine engine of claim 2 wherein said combustion chambers are positioned normal to said turbine wheel.

4. The turbine engine of claim 2 wherein said turbine engine has at least two of said combustion chambers.

5. The turbine engine of claim 2 wherein said fuel-air mixture is compressed between 20 and 60 psi.

6. The turbine engine of claim 2 wherein power-take-off gears are rotatably connected to said turbine wheel.

7. The turbine engine of claim 2 having at least one compressed air inlet means to the periphery of said turbine wheel to assist the combustion of unburned fuel therein.

8. A method of driving a rotatably mounted vaned turbine wheel wherein a plurality of pistons are slideably mounted in a like number of combustion chambers around the periphery of said wheel, each of said chambers having at the combustion end thereof, a compressed air-fuel input port and an exhaust port adjacent a portion of said vaned turbine wheel and fluid inlet and fluid discharge ports at the fluid flow end thereof, said discharge port communicating with the compressed air-fuel input port for the next combustion chamber, which communicates with said turbine wheel comprising in each chamber:

moving said piston toward said combustion end to close said exhaust port, feeding air into the fluid flow end of said chamber behind said advancing piston, feeding a compressed air-fuel mixture into the chamber between the said piston and said closed exhaust port; igniting said mixture, driving said piston away from said exhaust port to open said exhaust port and drive said combustion gases against the vanes of said turbine wheel spinning said wheel and concurrently driving said piston toward the fluid flow end of said chamber to compress and expel said air out said discharge port to mix with fuel and be input as a compressed air-fuel mixture into the combustion end of the next chamber to recommence the combustion-exhaust cycle and drive said turbine engine.

9. The method of claim 8 wherein said air-fuel mixture is compressed between 10 to 100 psi.

10. The method of claim 8 wherein compressed air is introduced to the periphery of said turbine wheel prior to each combustion chamber exhaust port to complete the fuel combustion in said turbine engine.

* * * * *